US012589960B2

(12) United States Patent
Hege et al.

(10) Patent No.: US 12,589,960 B2
(45) Date of Patent: Mar. 31, 2026

(54) UPPER CONVEYOR DECK HAVING AT LEAST ONE DIVERTED BELT SECTION AND A SCRAP DEFLECTOR AT THE DIVERTED BELT SECTION AND CONVEYOR INCLUDING THE UPPER CONVEYOR DECK

(71) Applicant: A. G. Stacker Inc., Weyers Cave, VA (US)

(72) Inventors: Dalton Hege, Weyers Cave, VA (US); Joseph Wunder, Lexington, VA (US); Robert Knupp, Staunton, VA (US); Eric Stempihar, Rockingham, VA (US)

(73) Assignee: A. G. Stacker Inc., Weyers Cave, VA (US)

(*) Notice: Subject to any disclaimer, the term of this patent is extended or adjusted under 35 U.S.C. 154(b) by 394 days.

(21) Appl. No.: 18/214,631

(22) Filed: Jun. 27, 2023

(65) Prior Publication Data

US 2023/0416026 A1 Dec. 28, 2023

Related U.S. Application Data

(60) Provisional application No. 63/367,133, filed on Jun. 28, 2022.

(51) Int. Cl.

*B65H 5/02* (2006.01)
*B65H 29/12* (2006.01)
*B26D 7/18* (2006.01)

(52) U.S. Cl.

CPC ............. *B65H 5/023* (2013.01); *B65H 29/12* (2013.01); *B26D 7/18* (2013.01); *B65H 2404/25* (2013.01); *B65H 2404/252* (2013.01); *B65H 2404/256* (2013.01); *B65H 2404/261* (2013.01); *B65H 2404/264* (2013.01); *B65H 2701/176* (2013.01); *B65H 2801/42* (2013.01)

(58) Field of Classification Search

CPC ....... B65H 5/023; B65H 29/12–29/145; B65H 2404/25–2404/2571; B65H 2404/26–2404/2693

See application file for complete search history.

(56) References Cited

U.S. PATENT DOCUMENTS 4,805,891 A * 2/1989 Luperti ................ B65H 29/145 271/220
11,261,048 B2 3/2022 Allen, Jr. et al.
11,649,132 B2 5/2023 Allen, Jr. et al.

* cited by examiner

*Primary Examiner* — Jeremy R Severson

(74) *Attorney, Agent, or Firm* — J-TEK LAW PLLC; Jeffrey D. Tekanic; Scott T. Wakeman

(57) ABSTRACT

An upper conveyor deck includes a plurality of belts each supported by an upstream end pulley and a downstream end pulley which belts are configured to be driven along a closed path having an interior such that a lower run of each of the belts travels in a downstream direction and an upper run of the each of the belt travels in an upstream direction. A first diversion pulley in the interior of at least one of the belts contacts the lower run of that belt, and a diversion guide outside the interior of the belt contacts the belt downstream from the first diversion pulley. A deflecting device at the first diversion pulley is configured to prevent scrap material from becoming pinched between the belt and the first diversion pulley.

19 Claims, 10 Drawing Sheets

UPPER CONVEYOR DECK HAVING AT LEAST ONE DIVERTED BELT SECTION AND A SCRAP DEFLECTOR AT THE DIVERTED BELT SECTION AND CONVEYOR INCLUDING THE UPPER CONVEYOR DECK

CROSS-REFERENCE TO RELATED APPLICATIONS

The present application claims the benefit of U.S. Provisional Patent Application No. 63/367,133 filed Jun. 28, 2022, the entire contents of which is hereby incorporated by reference.

TECHNOLOGICAL FIELD

The present invention is directed to an upper conveyor deck having at least one diverted belt section and a scrap deflector at the diverted belt section and to a conveyor including the upper conveyor deck.

BACKGROUND

A conveyor, sometimes referred to as a "layboy," may be mounted at the discharge side of a rotary die cut machine for receiving one or more streams of sheets or blanks (of corrugated paperboard, for example) produced by the rotary die cut machine. These conveyors can include an upper conveyor deck that defines an upper boundary of a sheet transport path through the conveyor and a lower support, which may comprise a conveyor deck, that defines a lower boundary of the sheet transport path.

The upper conveyor deck includes a plurality of upper belts that each extend in a sheet transport direction from an upstream pulley to a downstream pulley. Blanks output by the rotary die cut machine enter an upstream end of the layboy and are pulled in the downstream direction by the rotating upper belts, the bottom runs of which move in the downstream direction, and then discharged from the downstream end of the layboy.

A conventional rotary die cut machine cuts finished blanks from sheets or webs of material that are input to the machine. Scrap is produced during this process which consists mainly of the portions of the sheets of material that do not become part of a finished blank. In addition, each blank may include slots or through-openings. The material cut from the input material to form these slots and through-openings also constitutes scrap.

Most scrap drops beneath or immediately downstream of the die cut machine as it operates. However some scrap, especially small, lightweight pieces of scrap, may be ejected from the die cut machine in such a manner that it falls into the layboy from above or is drawn into the intake end of the layboy either alone or along with the blanks. Scrap in the transport path from the die cut machine to the final stack of blanks may adversely affect the transport of the blanks. That is, the scrap may interfere with the alignment of the blanks or lead to jams. Alternately, if the scrap is carried all the way through the transport path and into the final stack of blanks, the blanks in the stack will have gaps therebetween where the scrap material is present thus resulting in a crooked, or oversized or non-uniform stack of blanks. It is therefore desirable to eliminate or at least reduce the amount scrap material in the transport path of a layboy.

Layboys having improved scrap removal capabilities are disclosed in U.S. Pat. Nos. 11,261,048 and 11,649,132, both issued to A. G. Stacker Inc. and both of which are hereby incorporated by reference. FIG. 1 is a side elevational view of an upper belt module 20 and a lower belt module 30 of the layboy of U.S. Pat. No. 11,261,048. The module 20 includes an upper belt 28 that extends from an upstream end pulley 24 to a downstream end pulley 26 and a lower belt 38 that extends from an upstream end pulley 34 to a downstream end pulley 36. The upper belt module 20 also includes at least one diverted belt section (at pulleys 74, 76, 78) at which the upper layboy belt 28 is diverted away from the lower belt 38. If scrap is trapped between the upper and lower belts 28, 38 upstream of the diverted belt section, it may be easily removed when it reaches the diverted belt section because at this point it is no longer held against the lower belt 38 by the upper belt 28. The operation and benefits of layboys having such diverted belt sections are described in detail in U.S. Pat. Nos. 11,261,048 and 11,649,132.

SUMMARY

The layboys disclosed in U.S. Pat. Nos. 11,261,048 and 11,649,132 perform well. However, it has been found that scrap sometimes becomes trapped between the upper belt 28 and one or more of the diversion guides or pulleys 74, 76, 78 that guide the diverted portion of the upper belt 28, in particular, the first diversion guide/pulley 74 at the entrance to the diverted belt section. Scrap trapped at this location can damage a belt because the belt will rub against the trapped scrap as it rotates. In addition, if any scrap gets drawn between the upper belt 28 and a pulley, especially the pulley 74, the scrap may dislodge the upper belt 28 from the pulley 74 and require a stoppage of the layboy (and thus the entire processing line that includes the layboy) to make repairs. It is therefore desirable to protect the belts and pulleys of the diverted belt section of a layboy from such damage.

This problem and others are addressed by embodiments of the present disclosure, a first aspect of which comprises an upper conveyor deck that includes a plurality of belts each supported by an upstream end pulley and a downstream end pulley and configured to be driven along a closed path having an interior such that a lower run of each of the belts travels in a downstream direction from the upstream end pulley to the downstream end pulley and an upper run of the each of the belt travels in an upstream direction from the downstream end pulley to the upstream end pulley. A first diversion pulley is located in the interior of at least one of the plurality of belts in contact with the lower run of the at least one of the plurality of belts, and a diversion guide is located outside the interior of the at least one of the plurality of belts in contact with the at least one of the plurality of belts downstream from the first diversion pulley. A deflecting device is provided at the first diversion pulley for preventing scrap material from becoming pinched between the at least one of the plurality of belts and the first diversion pulley.

Another aspect of the disclosure comprises a layboy configured to transport sheets of a material in a longitudinal direction from an upstream end to a downstream end. The layboy includes an upper belt section comprising a plurality of transversely spaced upper belts extending in the longitudinal direction from the upstream end to the downstream end, and each of the upper belts has a lower run defining an upper boundary of a transport path through the layboy. The layboy also includes at least one lower sheet support defining a lower boundary of the transport path. The lower run of at least one of the upper belts includes a first portion extending from the upstream end to a first diversion guide, a second portion extending from the downstream end to a second diversion guide, a diverted portion between the first diversion guide and the second diversion guide at which the at least one of the upper belts extends from the first diversion guide to and around a third diversion guide offset from the transport path and from the third diversion guide to the second diversion guide such that the diverted portion of the belt is spaced from the transport path. A deflecting device is mounted upstream of the first diversion guide for preventing scraps of the material from becoming pinched between the first belt and the first diversion guide.

Another aspect of the disclosure comprises an upper conveyor deck that includes a plurality of belts each supported by an upstream end pulley and a downstream end pulley and configured to be driven along a closed path having an interior such that a lower run of each of the belts travels in a downstream direction from the upstream end pulley to the downstream end pulley and an upper run of the each of the belt travels in an upstream direction from the downstream end pulley to the upstream end pulley. A first diversion pulley in the interior of at least one of the plurality of belts contacts the lower run of the at least one of the plurality of belts, and a diversion guide outside the interior of the at least one of the plurality of belts contacts the at least one of the plurality of belts downstream from the first diversion pulley. The upper conveyor deck also includes a housing upstream from the first diversion pulley that has an opening facing in the downstream direction and an interior in communication with the opening. At least part of the first diversion pulley extends through the opening into the interior, and a portion of the lower run of the belt extends through an open channel in a bottom wall of the housing.

DETAILED DESCRIPTION

Figure 1:
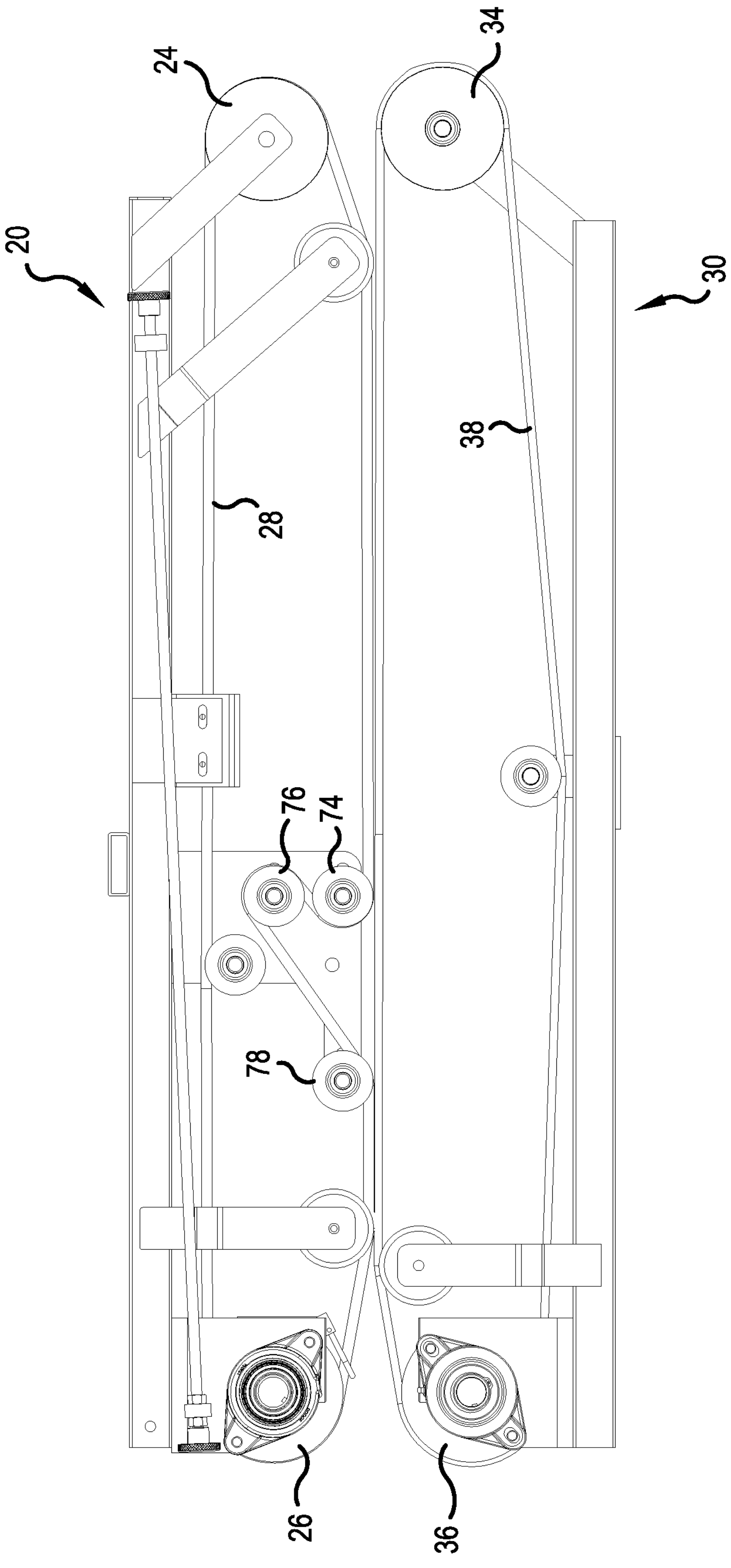
FIG.1 CONVENTIONAL ART
FIG. 1 is a side elevational view of a conventional layboy having an upper conveyor deck with a diverted belt section.
Figure 2:
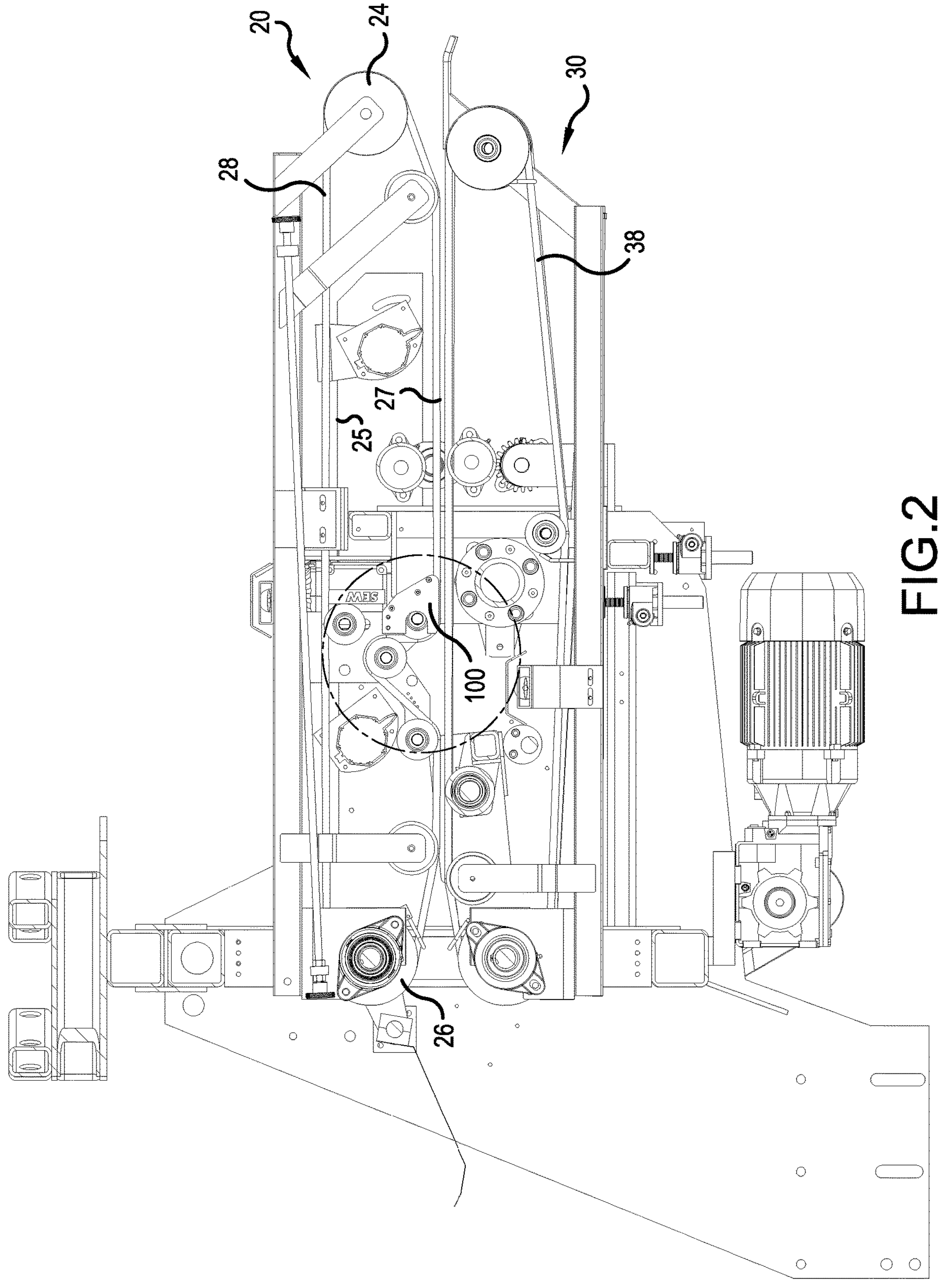
FIG. 2 is a side elevational view of a layboy having an upper conveyor deck with a diverted belt section and a scrap diverter according to a first embodiment of the present disclosure.

Referring now to the drawings, wherein the showings are for the purpose of illustrating presently preferred embodiments of the disclosure only and not for the purpose of limiting same, FIG. 2 shows a side view of a layboy having an upper conveyor deck having an upper belt module 20 and a lower conveyor deck having a lower belt module 30 as disclosed in U.S. Pat. No. 11,261,048 and a scrap deflector 100 according to the present disclosure, the location of which is shown in detail in FIG. 3. FIG. 4 shows one of the upper belt modules 20 by itself for purposes of illustration. The scrap deflector 100 (an example of a "deflecting means") is mounted at the upstream side of the first diversion pulley 74 and partially surrounds the first diversion pulley 74 to make it difficult or impossible for scrap to enter between the upper belt 28 and the first pulley 74.

Figure 4:
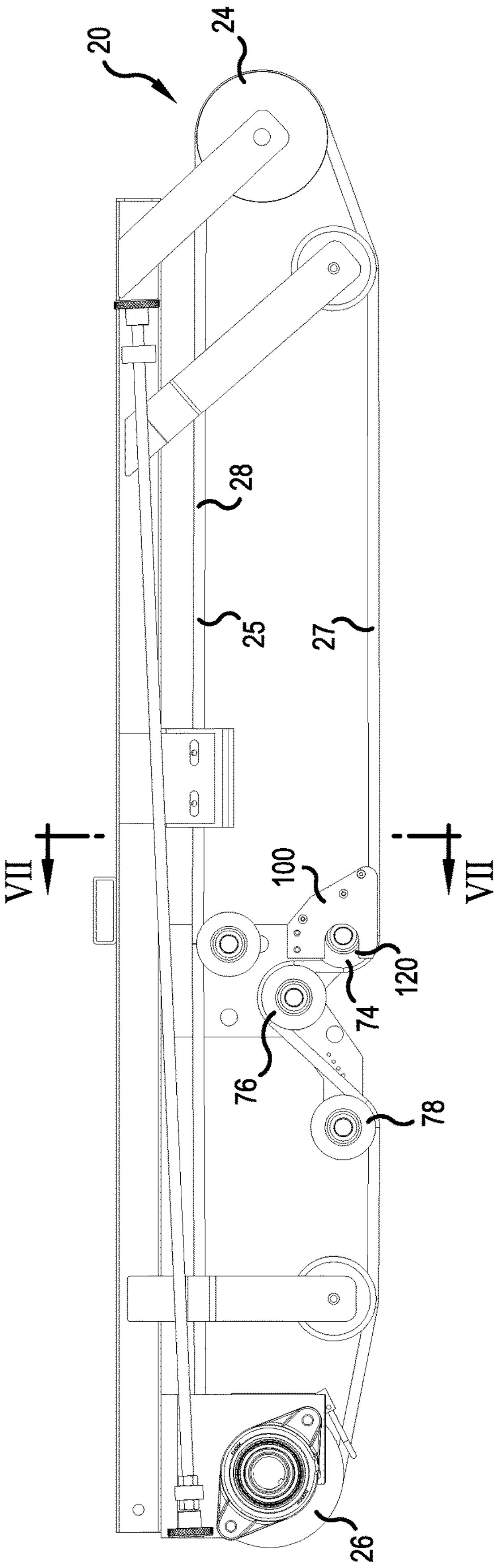
FIG. 4 is a side elevational view of one belt module of the upper conveyor deck of FIG. 2 separated from the layboy for illustration purposes.
Figure 5:
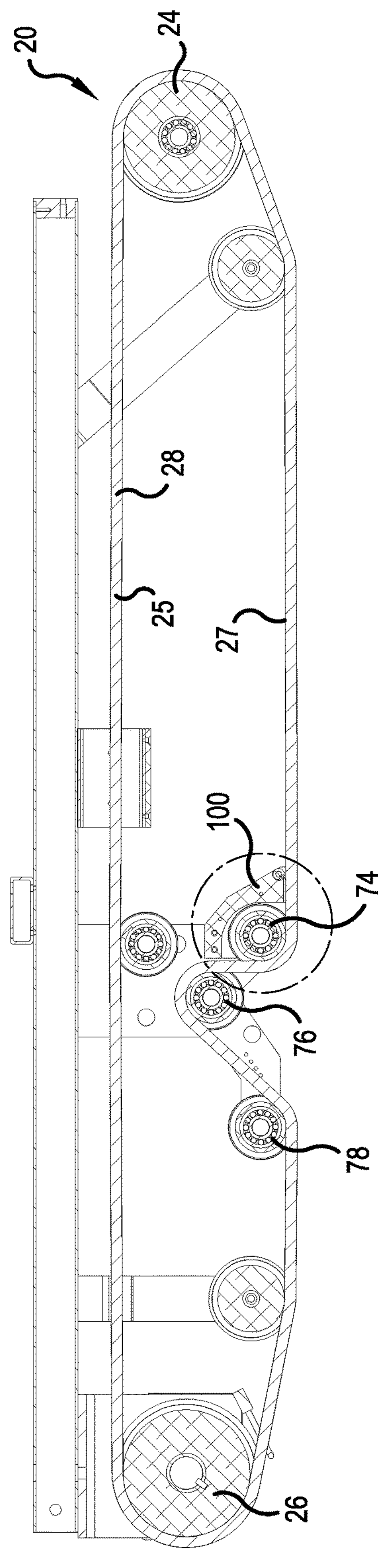
FIG. 5 is a vertical section through the belt module of FIG. 4.
Figure 6:
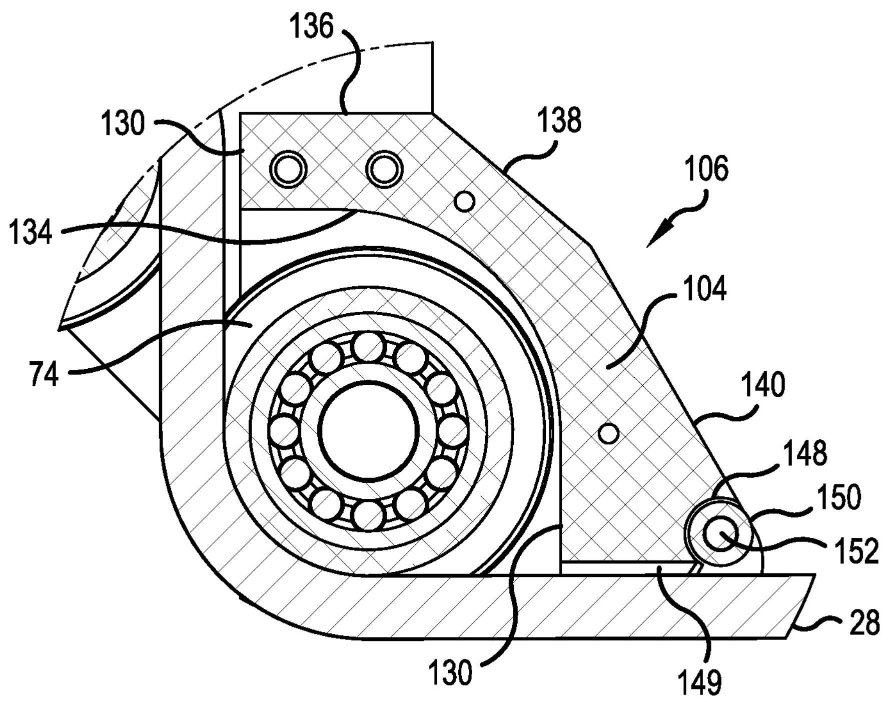
FIG. 6 is a sectional detail view of one of the diversion pulleys and the scrap diverter of FIG. 5.

Still referring to FIG. 4, the upper belt 28 extends along a closed path between an upstream end pulley 24 at the upstream end of the upper belt module 20 and a downstream end pulley 26 at the downstream end of the upper belt module 20 and includes an upper run 25 and a lower run 27. The lower run 27 of the upper belt 28 extends from the upstream end pulley 24 to the first diversion pulley 74 where it wraps approximately 90 degrees around the first diversion pulley 74 before reaching a diversion guide 76, which, in the present embodiment is formed by a second diversion pulley. FIG. 5 shows a vertical section through the upper belt module 20 which allows the path of the upper belt 28 inside the scrap deflector 100 (shown in detail in FIG. 6) to be seen. The scrap deflector 100 of the present disclosure can provide benefits when a belt wraps at least 45 degrees around a pulley and in particular at least 90 degrees around a pulley, due to the fact that jamming and/or a dislodging of the belt is more likely to occur when wraps of this extent are present.

Figure 8:
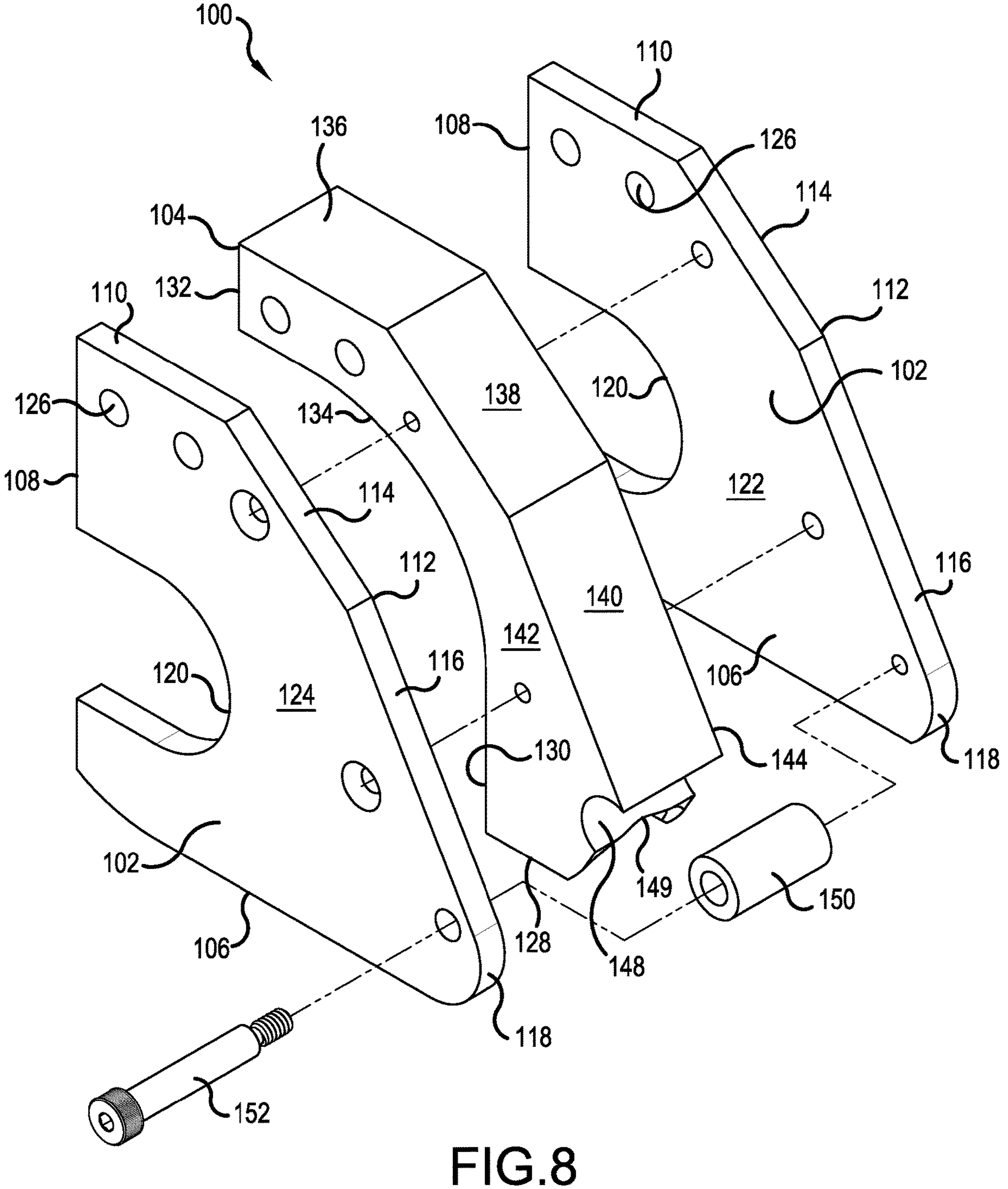
FIG. 8 is an exploded perspective view of the scrap diverter of FIG. 2.
Figure 10:
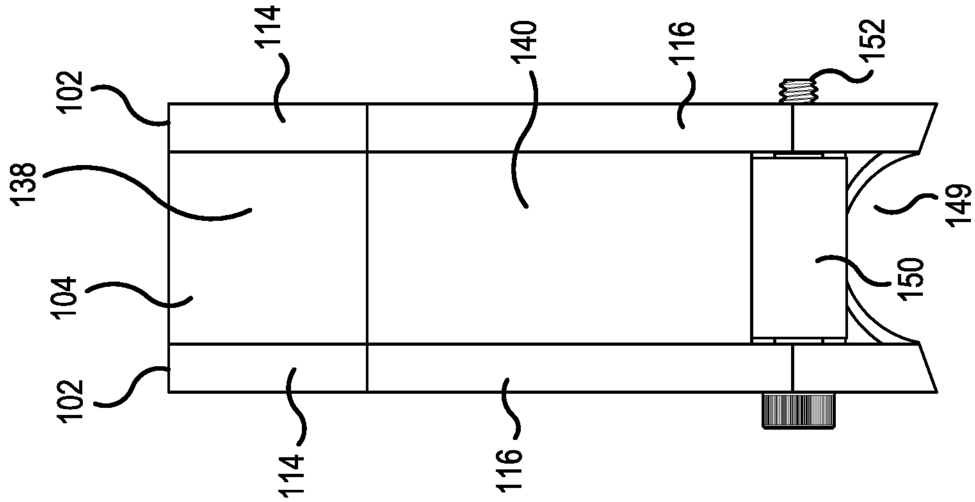
FIG. 10 is an end elevational view of the scrap diverter of FIG. 8.
Figure 9:
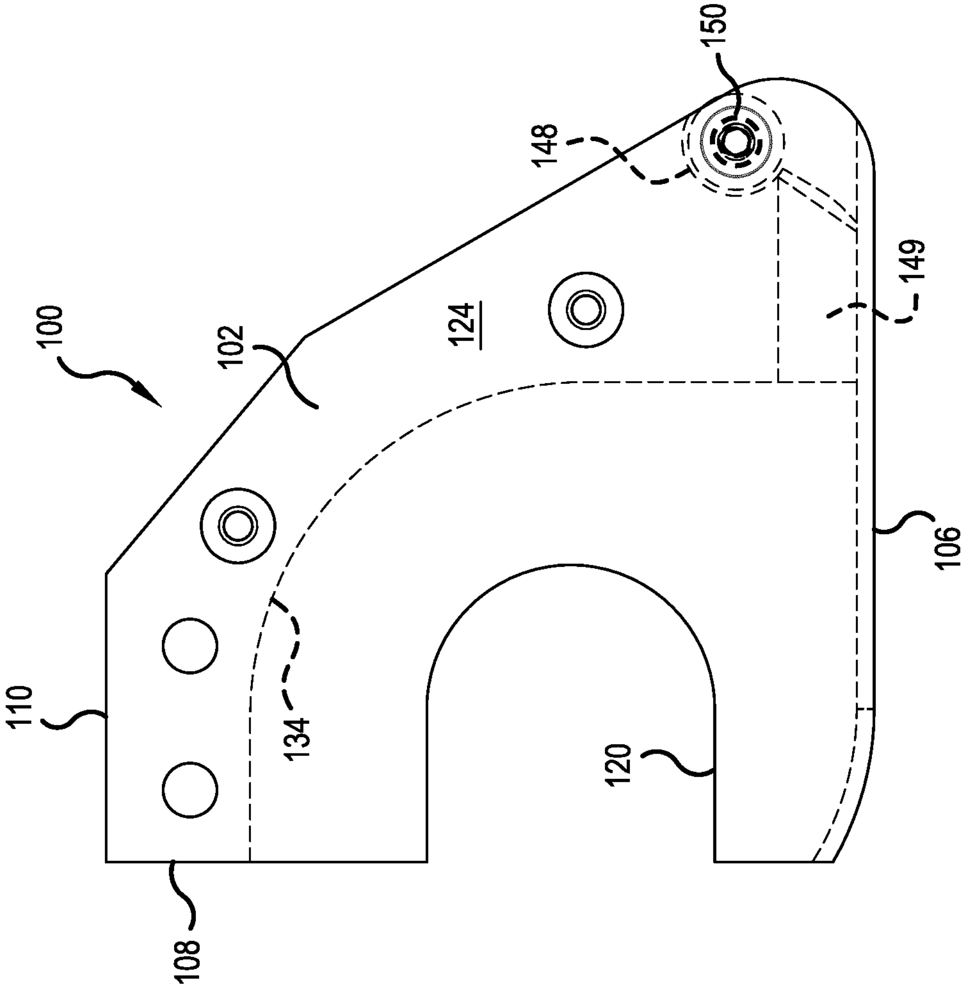
FIG. 9 is a side elevational view of the scrap diverter of FIG. 8.
Figure 11:
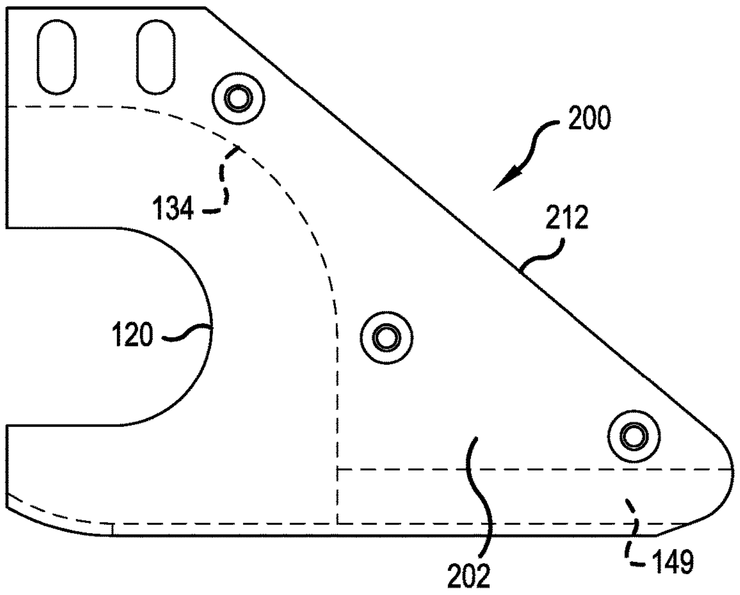
FIG. 11 is a side elevational view of a second embodiment of a scrap diverter according to the present disclosure.
Figure 12:
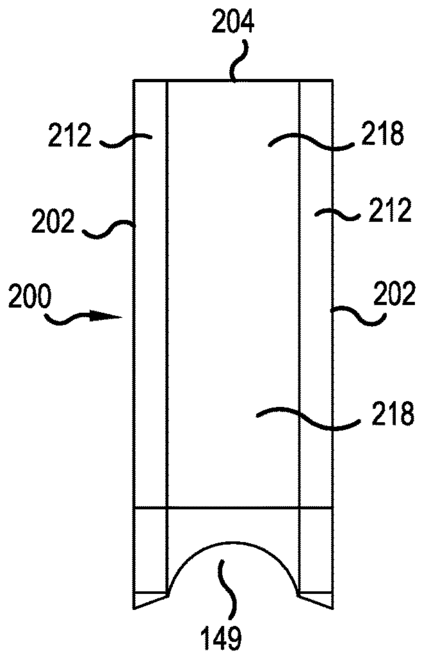
FIG. 12 is an end elevational view of the scrap diverter of FIG. 11.
Figure 13:
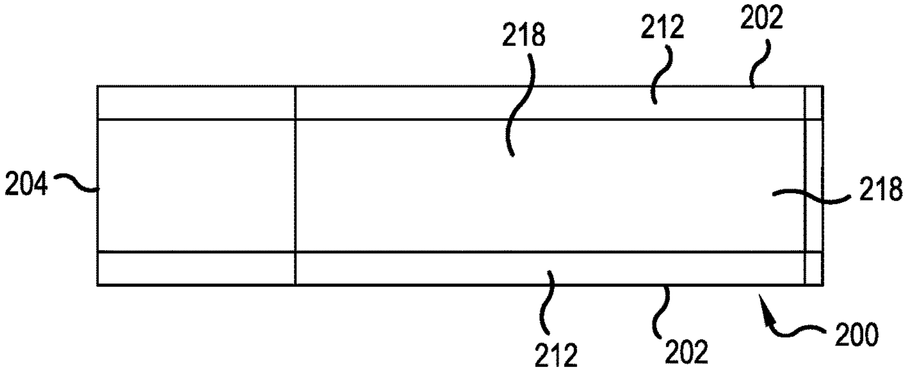
FIG. 13 is a top plan view of the scrap diverter of FIG. 11.
Figure 14:
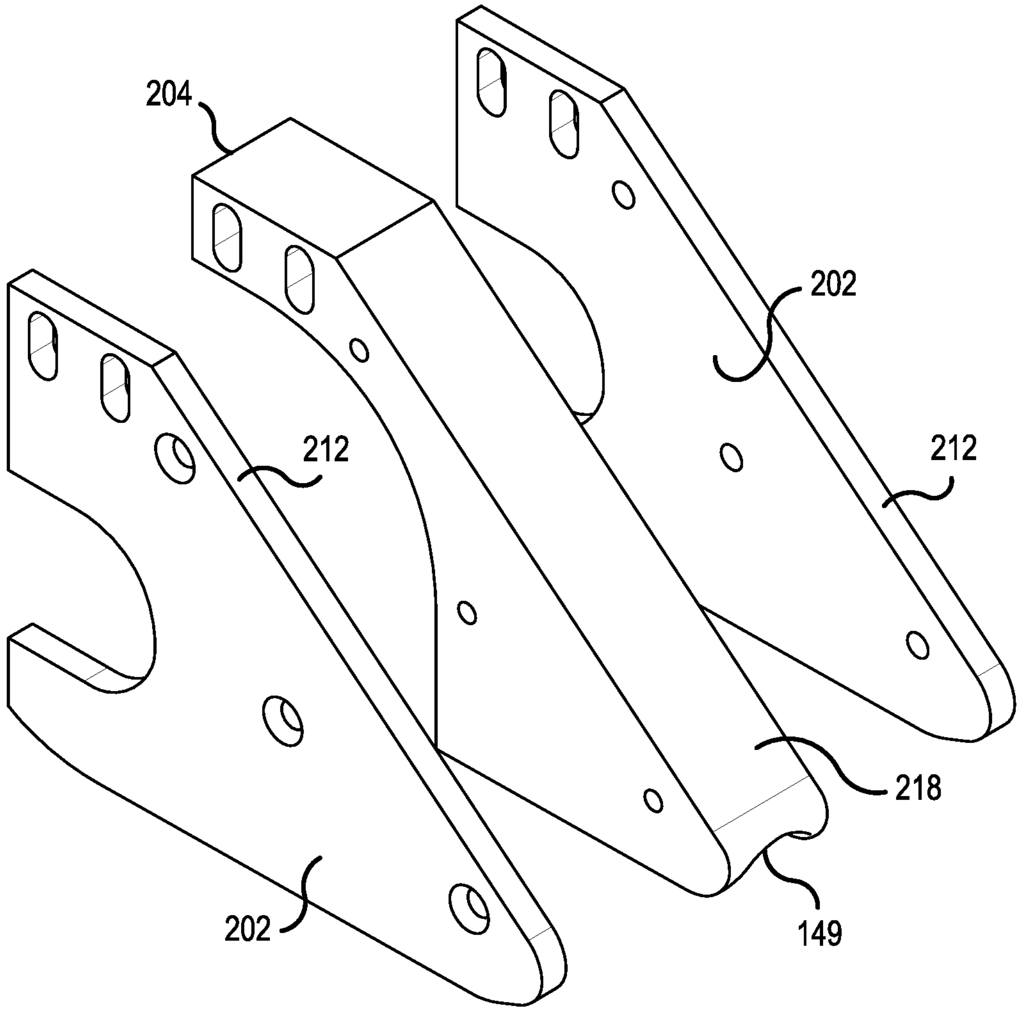
FIG. 14 is an exploded perspective view of the scrap diverter of FIG. 11.

The structure of the scrap deflector 100 itself is shown FIGS. 8-10, which are drawn to scale. The scrap deflector 100 includes first and second side plates 102 and a central body 104 mounted between the side plates 102. The side plates 102 are mirror images of one another, and only one of the side plates 102 will be described. The side plates 102 and the central body 104 can be formed from metal or plastic, and, while in the disclosed embodiment the side plates 102 and the central body 104 are formed as separate elements, the scrap deflector 100 could in the alternative be molded as a unitary structure.

Each of the side plates 102 includes a bottom edge 106, a front edge 108, a top edge 110 and a rear edge 112 extending from the top edge 110 to the bottom edge 106. The rear edge can be linear (as in the second embodiment discussed below) or, as illustrated in FIG. 10, may include a plurality of rear edge segments including a first rear edge segment 114 extending from the top edge 110, a second rear edge segment 116 extending from the first rear edge segment 114 and a curved portion 118 connecting the second rear edge segment 116 to the bottom edge 106. The front edge 108 includes a U-shaped cutout 120 that extends inwardly from the front edge 108 toward the second rear edge segment 116. The side plates 102 also include an inner surface 122 and an outer surface 124 and a plurality of through openings 126 for receiving fasteners for connecting the side plates 102 to the central body 104.

The central body 104 includes a bottom wall 128, an inner front wall portion 130, an outer front wall portion 132 and a concave front wall portion 134 connecting the inner front wall portion 130 to the outer front wall portion 132. The inner front wall portion 130 and the concave front wall portion form a concavity in the central body 104. The central body 104 also includes a top wall 136, a first rear wall segment 138, a second rear wall segment 140, a first side wall 142 and a second side wall 144. A C-shaped transverse channel 148 extends from the first side wall 142 to the second side wall 144 at the junction of the second rear wall segment 140 and the bottom wall 128, and a C-shaped longitudinal channel 149 extend into the bottom wall 128 and runs from the transverse channel 148 to the inner front wall portion 130. Preferably the open channel 149 has a cross section complementary to the cross section of the belt 28 that will be received in the open channel 149 and is open in a downward direction.

The scrap deflector 100 is formed by placing the inner wall 122 of a first one of the side plates 102 against the first side wall 142 of the central body 104 and placing the inner wall 122 of a second one of the side plates 102 against the second side wall 144 of the central body 104 and connecting the side plates 102 to the central body 104 with fasteners (not illustrated) to form a housing having a front opening. A roller 150 is mounted in the transverse channel 148 on an axle 152 that extends between the side plates 102 so that the roller 150 is freely rotatable around the axle 152.

The scrap deflector 100 is mounted to the mounting plate 72 that supports the first, second and third diversion pulleys 74, 76 and 78 with the side walls 102 on opposites sides of the first diversion pulley 74 and with a portion of the lower run 27 of the upper belt 28 in the longitudinal open channel 149. As can be seen from FIG. 4, the U-shaped cutouts 120 of the side walls 102 accommodate ends of the axles that support the first diversion pulley 74, and the shape of the inner front wall portion 130 and the curved front wall portion 134 of the central body 104 accommodate the circular shape of the first diversion pulley 74. The inner front wall portion 130 and the curved front wall portion 134 of the central body are configured to partially surround the first diversion pulley 74 and cover the top, sides and upstream end of the first diversion pulley 74.

Figure 3:
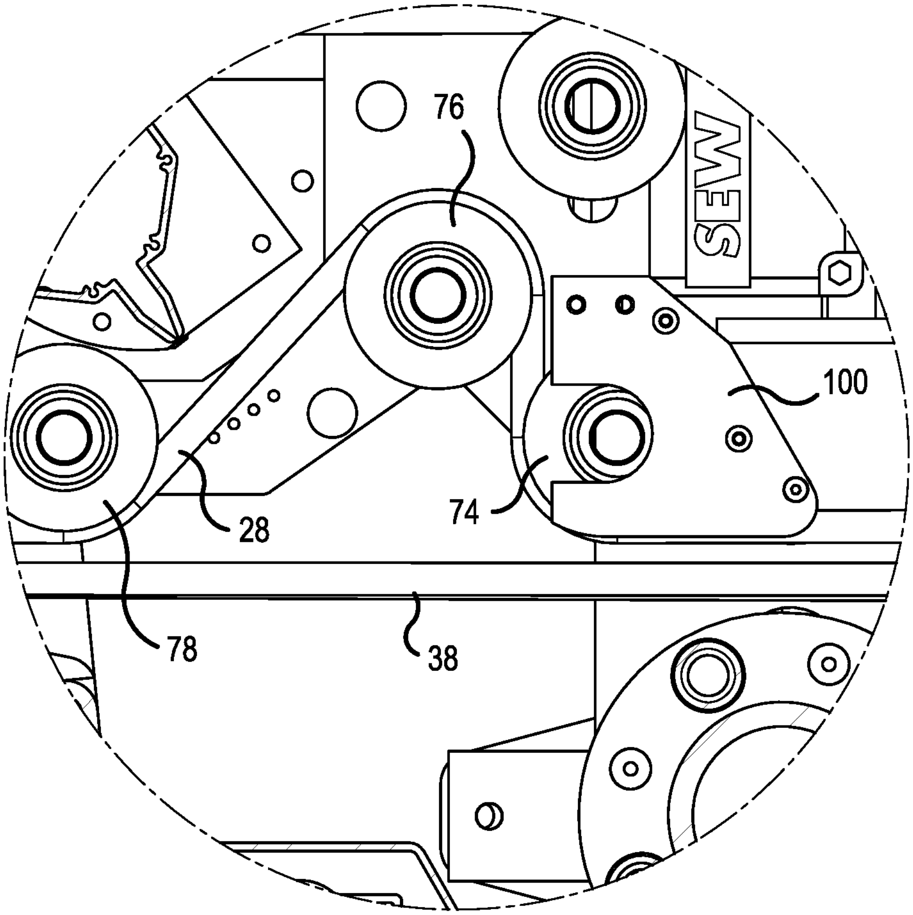
FIG. 3 is a detail view of the scrap diverter of FIG. 2.
Figure 7:
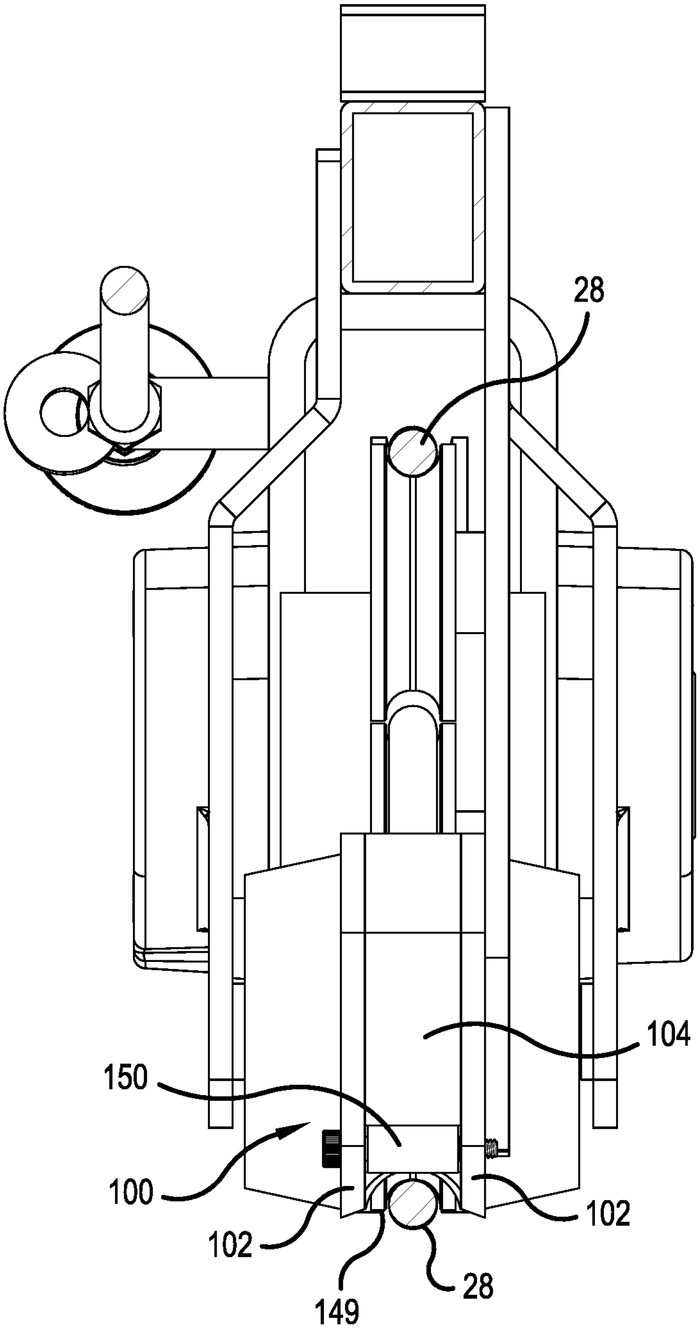
FIG. 7 is a sectional view in the direction of line VII-VII in FIG. 4.

As can be seen, for example, in FIGS. 3 and 7, the lower run 27 of the upper belt 28 runs between the side plates 102 in the longitudinal open channel 149 such that the side plates 102 form guides for the upper belt 28 and help keep the upper belt 28 in the groove of the first diversion pulley 74 even if scrap enters between the belt 28 and the first diversion pulley 74. However, as shown in FIG. 7, there is little space for scrap to enter the scrap deflector 100 at the location where the upper belt 28 enters the longitudinal open channel 149, and the gap between the upper belt 28 and the longitudinal open channel 149 will generally be selected to be less than the thickness of the scrap that may be present in the layboy. Any scrap carried by the upper belt 28 toward the scrap deflector 100 will impact the first rear wall segment 138 or the second rear wall segment 140 of the central body 104 and/or the first rear edge segment 114 and second rear edge segment 116 of the side plates 102 and be diverted away from the first diversion pulley 74. Due to the presence of the scrap deflector 100, even pieces of scrap intentionally placed at the upstream end of the longitudinal open channel 149 are prevented from entering the scrap deflector 100, and scrap that arrives at the scrap deflector 100 from different directions in different orientations is also deflected. The scrap deflector 100, however, does not interfere with movement of the upper belt 28 or movement of product (e.g., sheets of corrugated paperboard) through the layboy.

In the event that scrap impacting the scrap deflector 100 at the entrance end of the longitudinal open channel 149 jostles the belt 28 and affects its movement through the scrap deflector 100, deflecting it upwardly, for example, the roller 150 limits this upward movement of the upper belt 28 and minimizes friction if the upper belt 28 impacts the scrap deflector 100 as compared to what might occur if the upper belt 28 rubbed against a fixed portion of a scrap deflector. Thus, while the roller 150 is optional, it helps avoid damage to the upper belt 28.

FIGS. 11-14 show a scrap deflector 200 according to a second embodiment of the present disclosure. The scrap deflector 200 is generally similar to the scrap deflector 100 with differences described below. First, the scrap deflector 200 does not include the roller 150. Next, the first and second side plates 202 include a single linear rear edge 212 that does not include first and second segments, and the central body 204 includes a single rear wall 218 rather than first and second rear wall segments as shown in the first embodiment. The mounting and function of the second scrap deflector 200 are otherwise generally the same as those of the first scrap deflector 100 described above.

The scrap deflectors 100 and 200 could be used on any of the diversion guides/pulleys of the various embodiments of the layboys shown in U.S. Pat. Nos. 11,261,048 and 11,649,132 or on pulleys in other conveyor decks where scrap must be prevented from entering between a belt and a pulley without departing from the scope of the present disclosure.

The present invention has been described herein in terms of presently preferred embodiments. Various modifications and additions to these embodiments will become apparent to persons of ordinary skill in the relevant art upon a reading of the foregoing description in connection with the attached drawings. It is intended that all such modifications and additions form a part of the present invention to the extent they fall within the scope of the several claims appended hereto.

What is claimed is:

1. An upper conveyor deck comprising:

a plurality of belts each supported by an upstream end pulley and a downstream end pulley and configured to be driven along a closed path having an interior such that a lower run of each of the belts travels in a downstream direction from the upstream end pulley to the downstream end pulley and an upper run of the each of the belt travels in an upstream direction from the downstream end pulley to the upstream end pulley, a first diversion pulley in the interior of at least one of the plurality of belts in contact with the lower run of the at least one of the plurality of belts, a diversion guide outside the interior of the at least one of the plurality of belts in contact with the at least one of the plurality of belts downstream from the first diversion pulley, and deflecting means at the first diversion pulley for preventing scrap material from becoming pinched between the at least one of the plurality of belts and the first diversion pulley, wherein the deflecting means comprises a body having a downwardly facing open channel extending in the downstream direction, at least a portion of the body being located upstream from the first diversion pulley, and wherein the at least one of the plurality of belts runs through the open channel before reaching the first diversion pulley.

2. The upper conveyor deck according to claim 1, wherein the diversion guide comprises a second diversion pulley.

3. The upper conveyor deck according to claim 2, wherein the first diversion pulley and the second diversion pulley are positioned such that the at least one of the plurality of belts wraps at least 45 degrees around the first diversion pulley before reaching the second diversion pulley.

4. The upper conveyor deck according to claim 2, wherein the first diversion pulley and the second diversion pulley are positioned such that the at least one of the plurality of belts wraps at least 90 degrees around the first diversion pulley before reaching the second diversion pulley.

5. The upper conveyor deck according to claim 1, wherein at least part of the first diversion pulley extends into a concavity in the body.

6. The upper conveyor deck according to claim 5, including a first side plate attached to the body and covering a first open side of the concavity and a second side plate attached to the body and covering a second open side of the concavity.

7. The upper conveyor deck according to claim 6, including a roller having an axis of rotation perpendicular to the lower run of the belt mounted between the first side plate and the second side plate at an upstream end of the open channel.

8. The upper conveyor deck according to claim 1, wherein the deflecting means comprises a housing having an opening facing in the downstream direction and an interior in communication with the opening, wherein at least part of the first diversion pulley extends through the opening into the interior, wherein a first side wall of the housing overlies at least a portion of a first side of the first diversion pulley and a second side of the housing overlies at least a portion of a second side of the diversion pulley, and wherein a portion of the lower run of the at least one of the plurality of belts extends through an open channel defined by a bottom wall of the housing and wraps at least 45 degrees around the first diversion pulley.

9. The upper conveyor deck according to claim 8, wherein the housing covers an uppermost portion of the first diversion pulley.

10. The upper conveyor deck according to claim 8, including a roller having an axis of rotation perpendicular to the lower run of the at least one of the plurality of belts mounted at an upstream end of the open channel.

11. A layboy comprising:

at least one lower sheet support having an upper support surface; and an upper conveyor deck according to claim 1 mounted above the at least one lower sheet support, wherein the lower runs of the plurality of belts define an upper boundary of a sheet transport path through the layboy, and wherein the upper support surface forms a lower boundary of the sheet transport path through the layboy.

12. A layboy configured to transport sheets of a material in a longitudinal direction from an upstream end to a downstream end, the layboy comprising:

an upper belt section comprising a plurality of transversely spaced upper belts extending in the longitudinal direction from the upstream end to the downstream end, each of the upper belts having a lower run defining an upper boundary of a transport path through the layboy; and at least one lower sheet support defining a lower boundary of the transport path;

wherein the lower run of at least one of the upper belts includes a first portion extending from the upstream end to a first diversion guide, a second portion extending from the downstream end to a second diversion guide, a diverted portion between the first diversion guide and the second diversion guide at which the at least one of the upper belts extends from the first diversion guide to and around a third diversion guide offset from the transport path and from the third diversion guide to the second diversion guide such that the diverted portion of the belt is spaced from the transport path, and wherein a deflecting means is mounted at the first diversion guide and projects upstream of the first diversion guide, for preventing scraps of the material from entering between the first belt and the first diversion guide.

13. The layboy according to claim 12, wherein the first diversion guide comprises a first diversion pulley.

14. The layboy according to claim 13, wherein the deflecting means comprises a housing having an opening facing in the downstream direction and an interior in communication with the opening, wherein at least part of the first diversion pulley extends through the opening into the interior, wherein side walls of the housing overlie at least a portion of each side of the first diversion pulley, and wherein a portion of the lower run of the at least one of the upper belts extends through an open channel in a bottom wall of the housing.

15. The layboy according to claim 13, wherein the layboy is configured to transport sheets of material having a given thickness, and wherein a spacing between the lower run of at least one of the upper belts and the open channel is less than the given thickness.

16. An upper conveyor deck comprising:

a plurality of belts each supported by an upstream end pulley and a downstream end pulley and configured to be driven along a closed path having an interior such that a lower run of each of the belts travels in a downstream direction from the upstream end pulley to the downstream end pulley and an upper run of the each of the belt travels in an upstream direction from the downstream end pulley to the upstream end pulley, a first diversion pulley in the interior of at least one of the plurality of belts in contact with the lower run of the at least one of the plurality of belts, a diversion guide outside the interior of the at least one of the plurality of belts in contact with the at least one of the plurality of belts downstream from the first diversion pulley, and a housing at least partially enclosing the first diversion pulley, the housing having an opening facing in the downstream direction, an interior in communication with the opening, a closed upstream end opposite the opening, and a bottom wall extending upstream of the first diversion pulley and facing the at least one of the plurality of belts.

17. The upper conveyor deck according to claim 16, wherein the first diversion pulley and the diversion guide are positioned such that the at least one of the plurality of belts wraps at least 45 degrees around the first diversion pulley before reaching the diversion guide.

18. The upper conveyor deck according to claim 17, including a roller having an axis of rotation perpendicular to the lower run of the at least one of the plurality of belts mounted in a recess in the bottom wall at an upstream end of the bottom wall.

19. A layboy comprising:

at least one lower sheet support having an upper support surface; and an upper conveyor deck according to claim 16 mounted above the at least one lower sheet support, wherein the lower runs of the plurality of belts form an upper boundary of a sheet transport path through the layboy, and wherein the upper support surface forms a lower boundary of the sheet transport path through the layboy.

* * * * *